(12) United States Patent
Bergeron et al.

(10) Patent No.: US 12,276,202 B2
(45) Date of Patent: Apr. 15, 2025

(54) OIL TANK FOR AIRCRAFT ENGINE

(71) Applicant: PRATT & WHITNEY CANADA CORP., Longueuil (CA)

(72) Inventors: Sebastien Bergeron, St-Bruno-de-Montarville (CA); Marion Daniel, Verdun (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 134 days.

(21) Appl. No.: 17/219,171

(22) Filed: Mar. 31, 2021

(65) Prior Publication Data

US 2022/0316361 A1 Oct. 6, 2022

(51) Int. Cl.
*F01D 25/20* (2006.01)
*F01M 11/00* (2006.01)
(Continued)

(52) U.S. Cl.
CPC ......... *F01D 25/20* (2013.01); *F01M 11/0004* (2013.01); *F01M 11/064* (2013.01);
(Continued)

(58) Field of Classification Search
CPC ... F01M 2011/0037; F01M 2011/0041; F01M 2011/0095; F01M 2011/068;
(Continued)

(56) References Cited

U.S. PATENT DOCUMENTS 2,860,648 A * 11/1958 Harrison ................ B64D 37/22
244/135 R
3,685,528 A * 8/1972 Holland ................ F16K 24/046
137/43
(Continued)

FOREIGN PATENT DOCUMENTS

FR 2756255 A1 5/1998
GB 580006 A 8/1946

OTHER PUBLICATIONS

English translation of France patent document No. FR2756255 dated May 29, 1998, https://patents.google.com/patent/FR2756255A1/en?oq=FR2756255A1, accessed on Mar. 31, 2021.
(Continued)

*Primary Examiner* — Minh Truong
(74) *Attorney, Agent, or Firm* — Norton Rose Fulbright Canada LLP

(57) ABSTRACT

Aircraft engine oil tanks, lubrication systems, and associated methods are provided. The oil tank includes a first tank portion defining a first volume for holding oil and a second tank portion defining a second volume for holding oil, in fluid communication with the first volume. The first tank portion includes an oil outlet for delivering oil to a lubrication load via a pump. The first volume is in fluid communication with a vent opening for venting the oil tank. At least part of the second tank portion is disposed higher than the vent opening for retaining a quantity of oil inside the oil tank during a negative-g force flight condition and facilitate the recovery of the lubrication system following the negative-g force flight condition.

15 Claims, 6 Drawing Sheets

(51) Int. Cl.
*F01M 11/06* (2006.01)
*F16N 19/00* (2006.01)

(52) U.S. Cl.
CPC ........... *F01M 11/065* (2013.01); *F16N 19/00* (2013.01); *F01M 2011/0041* (2013.01); *F05D 2220/323* (2013.01)

(58) Field of Classification Search
CPC .. F01M 11/062; F01M 11/064; F01M 11/065; F01M 11/067; F16H 57/045; F16H 57/0453; F01D 25/20; F16N 19/00
See application file for complete search history.

(56) References Cited

U.S. PATENT DOCUMENTS

| | | | | |
|---|---|---|---|---|
| 3,889,705 | A | * | 6/1975 | Coderre ................. F16L 55/04 137/577 |
| 4,287,913 | A | | 9/1981 | Bennett et al. |
| 4,346,786 | A | | 8/1982 | Midgley |
| 4,572,120 | A | * | 2/1986 | Matsumoto .......... F01M 11/065 123/73 AD |
| 5,078,233 | A | * | 1/1992 | Oetting .................... F01M 1/12 123/196 R |
| 6,394,123 | B2 | * | 5/2002 | Menu ..................... B64D 37/22 137/171 |
| 6,463,819 | B1 | | 10/2002 | Rago |
| 8,051,869 | B2 | * | 11/2011 | Parnin .................... F16K 17/36 137/1 |
| 8,215,454 | B2 | * | 7/2012 | Portlock .................. F02C 7/36 184/6.12 |
| 8,602,165 | B2 | | 12/2013 | Szolomayer et al. |
| 10,301,969 | B2 | | 5/2019 | Desjardins et al. |
| 10,309,307 | B2 | * | 6/2019 | Sheridan ................... F01M 1/12 |
| 10,654,581 | B2 | | 5/2020 | Morgan et al. |
| 2013/0111867 | A1 | * | 5/2013 | Schmalz ................ A01D 34/82 123/196 R |
| 2014/0003906 | A1 | | 1/2014 | Motto |
| 2016/0208678 | A1 | * | 7/2016 | Zhang ..................... F16N 19/00 |
| 2020/0116048 | A1 | | 4/2020 | Bellis |

OTHER PUBLICATIONS

European Patent Office, Communication re. extended European search report for European patent application No. 22166147.3, Jun. 27, 2022.

* cited by examiner

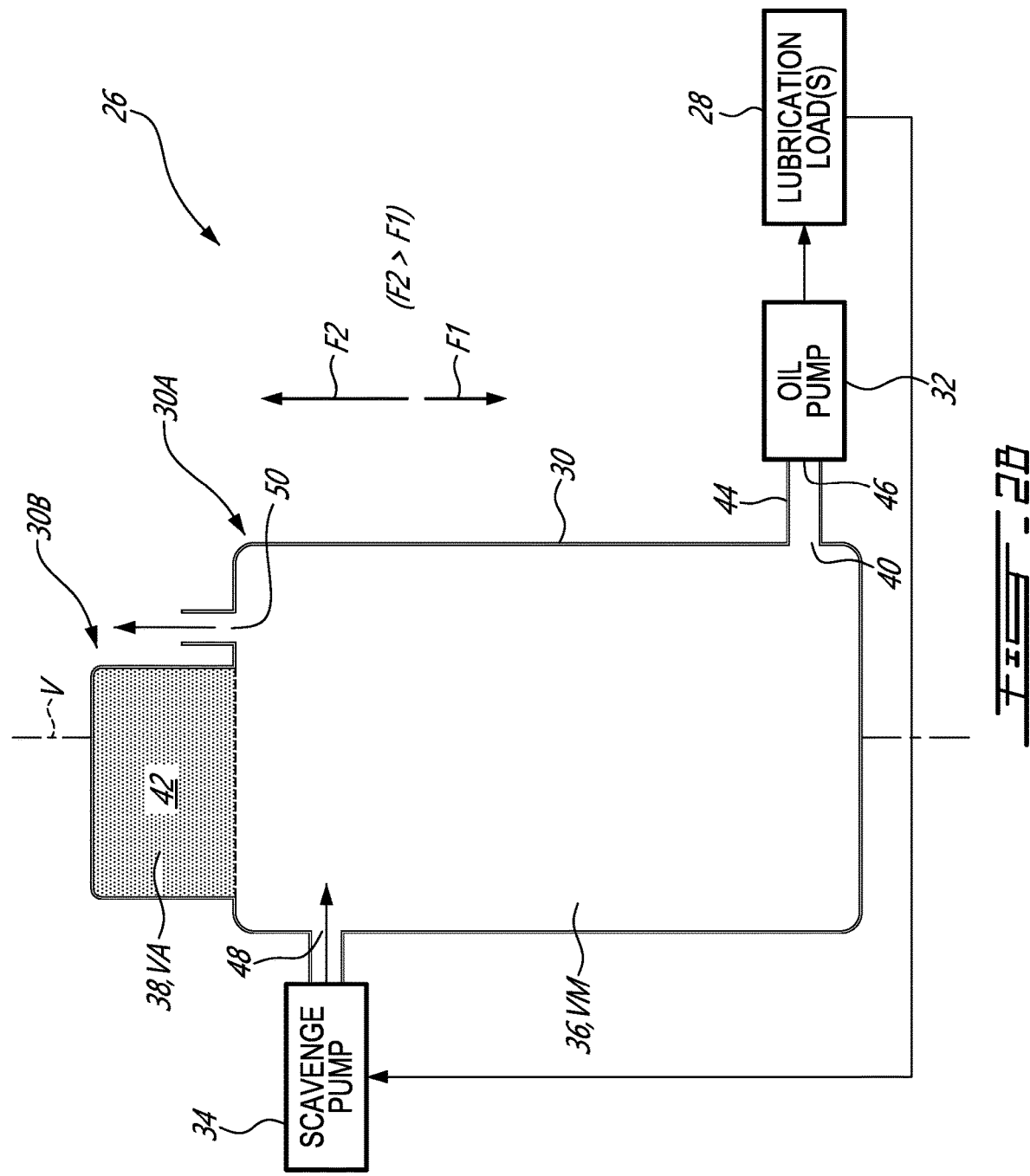

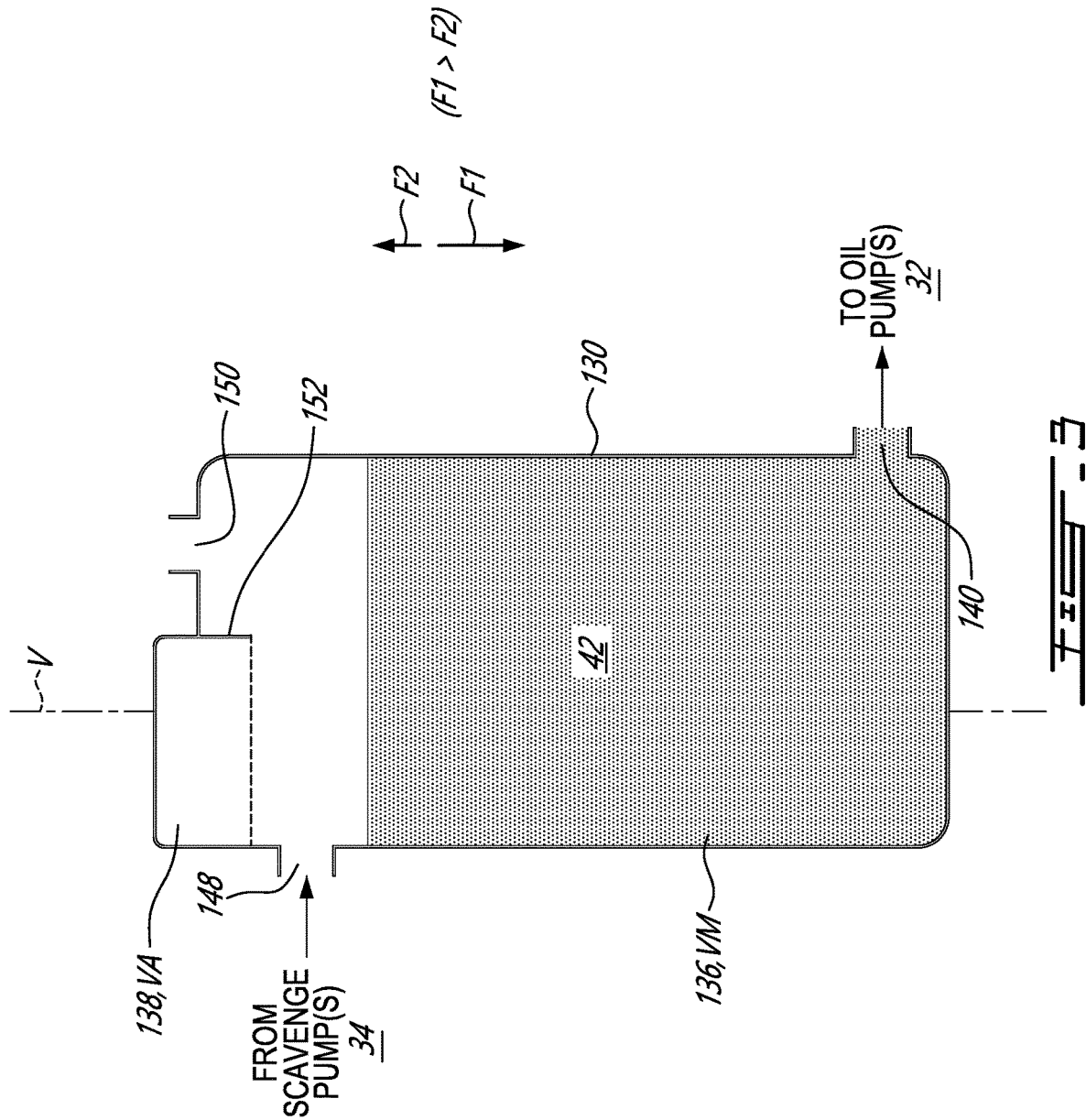

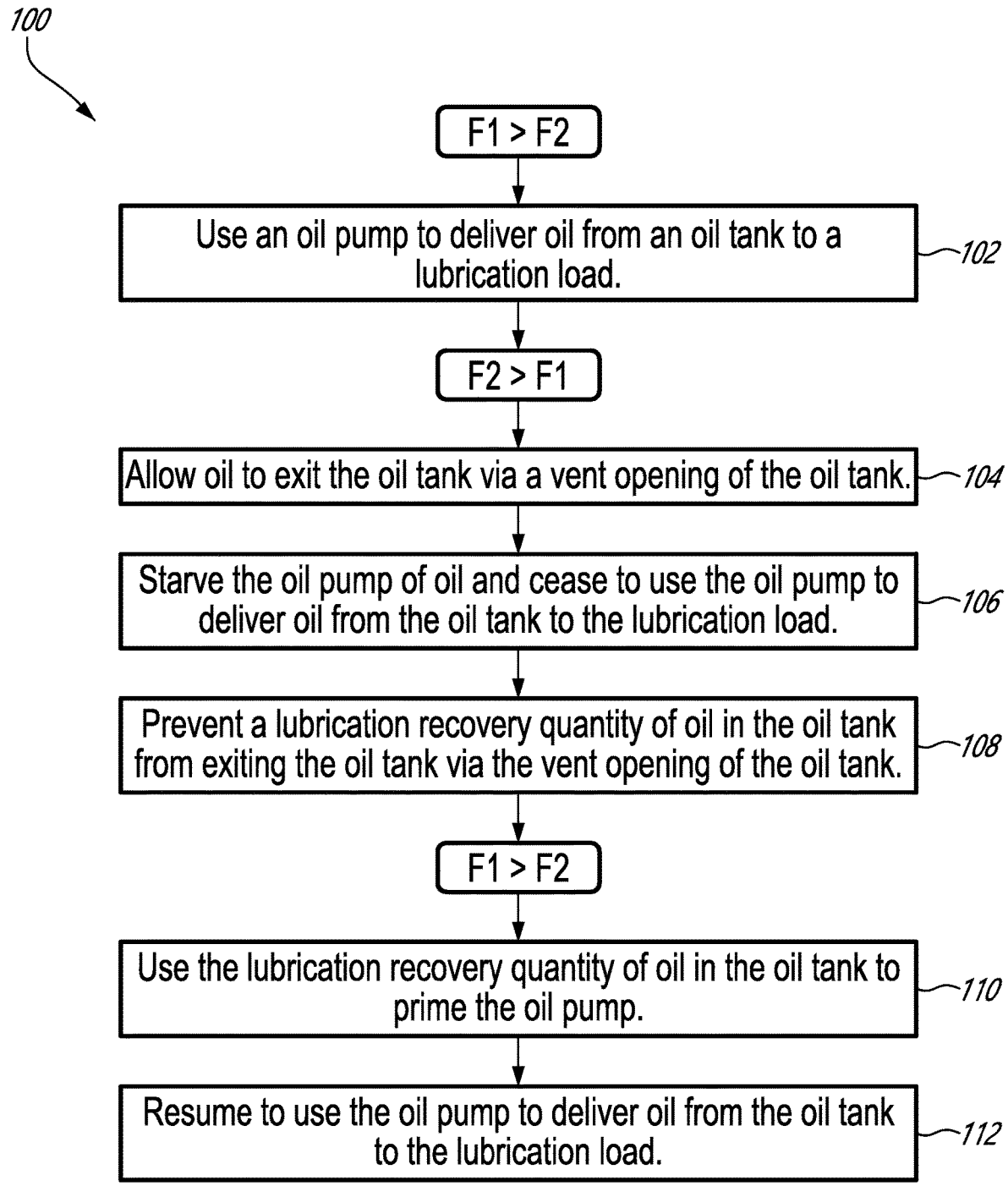

OIL TANK FOR AIRCRAFT ENGINE

TECHNICAL FIELD

The disclosure relates generally to aircraft engines, and more particularly to lubrication systems of aircraft engines.

BACKGROUND

A typical aircraft engine has a lubrication system to meet the lubrication and cooling needs of various components of the engine. The lubrication system can deliver oil from an oil tank to the various components within the engine, recover the used oil from the components, and return the recovered used oil back to the oil tank. Some aircraft maneuvers can cause shifting of the oil in the oil tank and such shifting of the oil can cause interruptions in the delivery of oil to the components of the engine. Improvement is desirable.

SUMMARY

In one aspect, the disclosure describes an aircraft engine oil tank comprising:
- a first tank portion defining a first volume for holding oil, the first tank portion including an oil outlet for delivering oil to a lubrication load, the first volume being in fluid communication with a vent opening for venting the oil tank, the oil outlet being disposed lower than the vent opening relative to an upright orientation of the aircraft engine oil tank; and
- a second tank portion defining a second volume in fluid communication with the first volume, at least part of the second volume being disposed higher than the vent opening relative to the upright orientation of the aircraft engine oil tank, an oil-holding capacity of the second volume being equal to or greater than a minimum quantity of oil required in the first volume for the oil outlet to be submerged in the oil in the upright orientation of the aircraft engine oil tank, the second tank portion preventing oil in the second volume from flowing to the vent opening when an upward force acting on the oil in the second volume is greater than a downward force acting on the oil in the second volume relative to the upright orientation of the aircraft engine oil tank.

In another aspect, the disclosure describes a lubrication system of an aircraft engine. The lubrication system comprises:
- an oil pump in fluid communication with a lubrication load for driving oil toward the lubrication load; and
- an oil tank in fluid communication with the oil pump for supplying oil to the oil pump, the oil tank including:
- a main chamber including:
- an oil outlet for delivering oil to the oil pump; and
- a vent opening for venting the main chamber, the vent opening being located higher than the oil outlet relative to an upright orientation of the aircraft engine oil tank associated with a straight-and-level flight condition of the aircraft; and
- an auxiliary chamber in fluid communication with the main chamber, at least part of the auxiliary chamber being disposed higher than the vent opening relative the upright orientation of the aircraft engine oil tank, an oil-holding capacity of the auxiliary chamber being equal to or greater than a minimum quantity of oil required in the main chamber to cause priming of the oil pump, the auxiliary chamber preventing oil in the auxiliary chamber from flowing to the vent opening when an upward force acting on the oil in the auxiliary chamber is greater than a downward force acting on the oil in the auxiliary chamber relative to the upright orientation of the aircraft engine oil tank.

In a further aspect, the disclosure describes a method of operating a lubrication system of an aircraft engine. The method comprises:
- during a first flight condition of an aircraft where a downward force acting on oil in an oil tank of the aircraft engine is greater than an upward force acting on the oil, using an oil pump to deliver oil from the oil tank to a lubrication load;
- following the first flight condition and during a second flight condition of the aircraft where the upward force acting on the oil in the oil tank of the aircraft engine is greater than the downward force acting on the oil:
- allowing the oil in the oil tank to exit the oil tank via a vent opening of the oil tank;
- starving the oil pump of the oil and ceasing to use the oil pump to deliver the oil from the oil tank to the lubrication load; and
- preventing a lubrication recovery quantity of oil in the oil tank from exiting the oil tank via the vent opening of the oil tank; and
- following the second flight condition and during a third flight condition of the aircraft where the downward force acting on the oil in the oil tank of the aircraft engine is greater than the upward force acting on the oil:
- using the lubrication recovery quantity of oil in the oil tank to prime the oil pump; and
- resuming to use the oil pump to deliver the oil from the oil tank to the lubrication load.

Further details of these and other aspects of the subject matter of this application will be apparent from the detailed description included below and the drawings.

DESCRIPTION OF THE DRAWINGS

Reference is now made to the accompanying drawings, in which:

FIG. 2B is a schematic representation of the lubrication system of FIG. 2A during a second flight condition of the aircraft;

FIG. 3 is a schematic representation of another exemplary oil tank suitable for use in the lubrication system of FIG. 1; and FIG. 4 is a flow diagram of a method of operating a lubrication system of an aircraft engine.

DETAILED DESCRIPTION

The following disclosure describes lubrication systems of aircraft engines and methods of operating such lubrication systems. In some embodiments, the systems and methods described herein may be configured to mitigate the duration of interruptions in the delivery of oil to components of aircraft engines that may occur during aircraft manoeuvers that cause shifting of the oil in oil tanks. For example, the systems and methods described herein may prevent a quantity of oil from being drained from the oil tank via a vent during some aircraft manoeuver(s) so that the retained quantity of oil may subsequently be available and used for priming an oil pump of the lubrication system to promote a prompt recovery of the lubrication system following such aircraft manoeuver(s).

The term "connected" or "coupled to" may include both direct connection or coupling (in which two elements contact each other) and indirect connection or coupling (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

Figure 1:
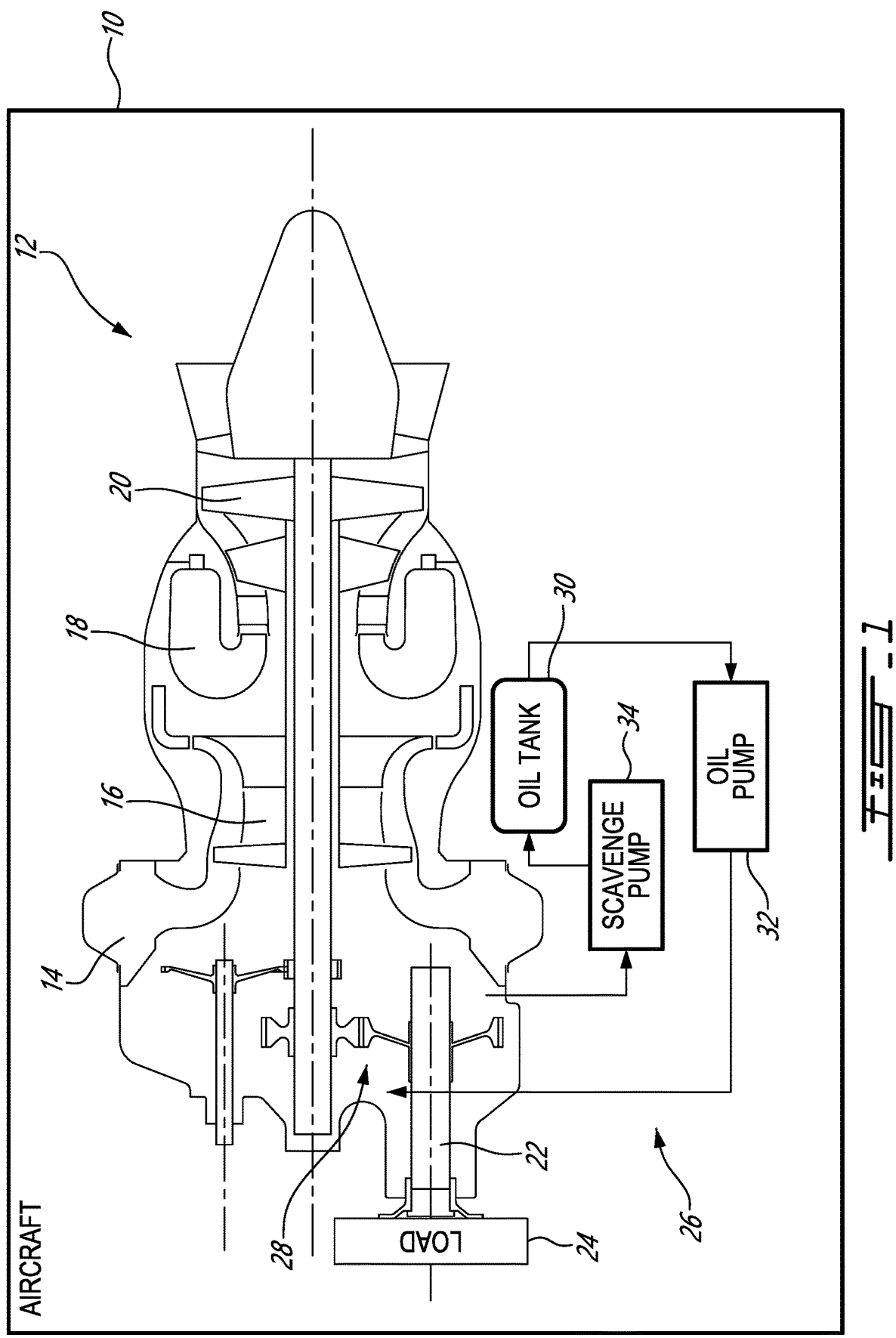
FIG. 1 shows a schematic axial cross-section view of an exemplary aircraft engine including a lubrication system as described herein.

FIG. 1 shows a schematic representation of aircraft 10 including aircraft engine 12 (referred hereinafter as "engine 12"). FIG. 1 shows an axial cross-section view of engine 12 illustrated as a turboshaft gas turbine engine as an example. However, it is understood that the systems, oil tanks and methods described herein are also applicable to other types of aircraft engines such as turbofan and turboprop gas turbine engines for example. Engine 12 may suitable for use in (e.g., subsonic flight) aircraft applications. In various embodiments, aircraft 10 may be a rotary-wing aircraft (e.g., helicopter) but it is understood that the systems, oil tanks and methods described herein are also applicable to other types of aircraft such as fixed-wing aircraft for example.

Engine 12 may include, in serial flow communication, air inlet 14 via which ambient air is received into engine 12, multistage compressor 16 for pressurizing the air, combustor 18 in which the compressed air is mixed with fuel and ignited for generating an annular stream of hot combustion gases, and turbine section 20 for extracting energy from the combustion gases. Engine 12 may include output shaft 22 drivingly coupled to load 24. Depending on the type of engine 12, load 24 may include a propeller or fan configured to generate thrust and propel aircraft 10. Alternatively or in addition, load 24 may include a main rotor of a helicopter.

Engine 12 may include lubrication system 26 for servicing one or more lubrication loads 28 of engine 12. Lubrication loads 28 (referred hereinafter in the singular) may include one or more bearings and/or gears that require lubrication and/or cooling. Lubrication system 26 may include oil tank 30 (or oil tank 130 shown in FIG. 3) and supply pressure oil pump 32 (referred hereinafter as "oil pump 32") in fluid communication with oil tank 30. Oil tank 30 may be disposed at any suitable location relative to engine 12. For example, oil tank 30 may be disposed in an internal, upper, lower or lateral region of engine 12. Oil tank 30 may be disposed proximate or remote of engine 12. Oil pump 32 may be operatively connected to supply lubricating fluid (e.g., oil) from oil tank 30 to lubrication load 28 of engine 12.

Lubrication system 26 may include scavenge oil pump 34 (referred hereinafter as "scavenge pump 34") that may drive used oil collected in one or more oil sumps of engine 12 back to oil tank 30 for recirculation. It is understood that some embodiments of lubrication system 26 may include additional components than those illustrated herein. Oil pump 32 and scavenge pump 34 may include gear type, gear-rotor type or other suitable type of oil pump. Oil pump 32 and scavenge pump 34 may be driven by any suitable motive power source such as electric motor(s), hydraulic motor(s), pneumatic motor(s) and/or one or more rotating/driven shafts of engine 12 being drivingly coupled to oil pump 32 and/or to scavenge pump 34 via an accessory gearbox for example.

Figure 2A:
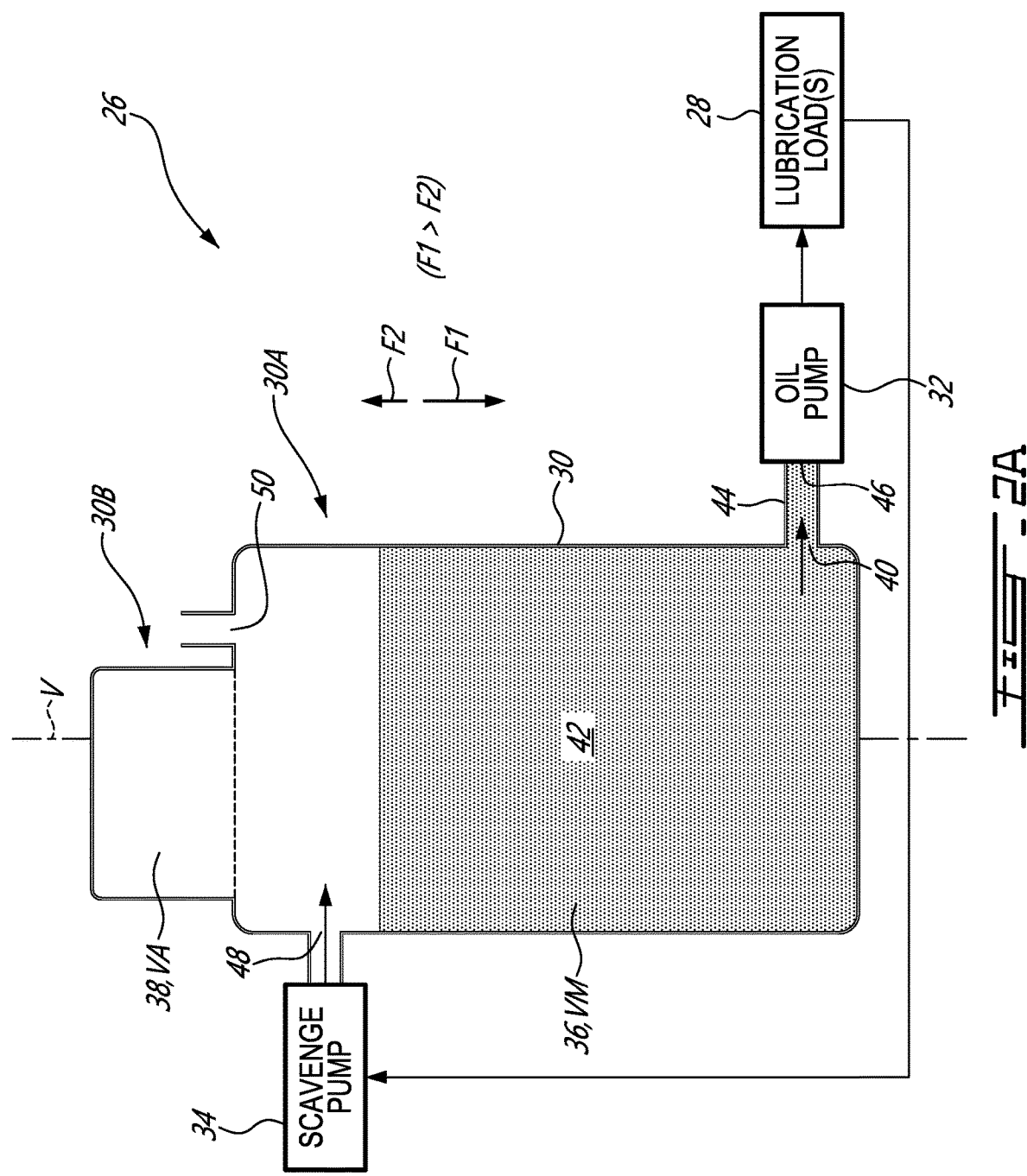
FIG. 2A is a schematic exemplary representation of the lubrication system of FIG. 1 during a first flight condition of an aircraft.

FIG. 2A is an exemplary schematic representation of lubrication system 26 during a first flight condition of aircraft 10. FIG. 2A shows a schematic configuration of oil tank 30 as non-limiting example. It is understood that aspects of the present disclosure can also be applied to oil tanks of other shapes and configurations. Oil tank 30 is illustrated in an upright orientation with vertical axis V shown as a reference. The upright orientation and disposition of oil 42 illustrated in FIG. 2A may correspond to an orientation of oil tank 30 associated with an unaccelerated flight condition of aircraft 10. The upright orientation may correspond to an orientation of oil tank 30 associated with a straight-and-level flight condition of aircraft 10 where an altitude and heading of aircraft 10 are held constant. It is understood that that during operation of aircraft 10, the orientation of oil tank 30 may vary from the upright orientation shown during different phases of flight and/or during different aircraft manoeuvers.

Oil tank 30 may be made from a metallic (e.g., steel) or other suitable material using known or other manufacturing (e.g., metal forming and fabrication) processes. Oil tank 30 may include first tank portion 30A including one or more main chambers 36 (referred hereinafter in the singular). Oil tank 30 may include second tank portion 30B including one or more auxiliary chambers 38 (referred hereinafter in the singular). Main chamber 36 of oil tank 30 may include oil outlet 40 via which oil 42 exits oil tank 30 and is routed to oil pump 32 where oil 42 is pressurised and driven by oil pump 32 toward lubrication load 28. Oil outlet 40 may be disposed in a lower portion of main chamber 36.

In some embodiments, oil pump 32 may be disposed outside of oil tank 30 and be in fluid communication with oil tank 30 via conduit 44. Conduit 44 may establish fluid communication between oil outlet 40 of oil tank 30 and inlet port 46 of oil pump 32. In some embodiments, oil pump 32 may be disposed outside of oil tank 30 but in close proximity to oil tank 30 so that conduit 44 may be relatively short or not required. In some embodiments, inlet port 46 may coincide with oil outlet 40 for example. In some embodiments, oil pump 32 may instead be disposed inside of main chamber 36 of oil tank 30 and be mounted to a (e.g., lower) wall of oil tank 30 for example. In some embodiments, inlet port 46 of oil pump 32 may correspond to an oil outlet of oil tank 30.

Oil tank 30 may include oil inlet 48 for receiving oil 42 from lubrication load 28 via scavenge pump 34 for recirculation for example. Oil inlet 48 may be disposed within main chamber 36 or within auxiliary chamber 38 of oil tank 30. In relation to the upright orientation of oil tank 30, oil inlet 48 may be disposed at a higher elevation than oil outlet 40. Oil inlet 48 may be disposed in an upper portion of main chamber 36. In some embodiments, an entirety of auxiliary chamber 38 may be disposed at a higher elevation than oil inlet 48.

Oil tank 30 may include vent opening 50 for venting oil tank 30 to facilitate the flow of oil 42 into and out of oil tank 30. In relation to the upright orientation of oil tank 30, vent opening 50 may be disposed at a higher elevation than oil outlet 40. Vent opening 50 may be disposed at a higher or a lower elevation than oil inlet 48. Vent opening 50 may be in fluid communication with one or more cavities enclosing one or more lubrication loads 28. For example, vent opening 50 may be in fluid communication with a bearing cavity or a (e.g., accessory) gear box of engine 12. In some embodiments, vent opening 50 may be defined in a wall of main chamber 36.

As explained further below, auxiliary chamber 38 may be used to promote a prompt recovery of lubrication system 26 after the interruption of oil delivery caused by shifting of oil 42 within tank 30. Auxiliary chamber 38 may be sized to have auxiliary volume VA (i.e., a maximum oil-holding capacity) that is equal to or greater than a lubrication recovery volume VR (shown in FIG. 2C) of oil 42 sufficient to initiate priming of oil pump 32. Auxiliary chamber 38 may be in fluid communication with main chamber 36. An entirety or at least part of auxiliary chamber 38 may be disposed at a higher elevation than vent opening 50 relative to the upright orientation of oil tank 30 so that some of oil 42 may be retained in auxiliary chamber 38 during some aircraft manoeuvers that would otherwise cause oil tank 30 to be emptied by way of oil 42 being drained out of oil tank 30 via vent opening 50. In other words, auxiliary chamber 38 may be sized and positioned to prevent a prescribed quantity of oil 42 from exiting oil tank 30 via vent opening 50 in some flight conditions.

Main chamber 36 of oil tank 30 may have an oil-holding capacity corresponding to main volume VM of main chamber 36. The selection of the size of auxiliary volume VA relative to main volume VM may vary for different configurations of oil tank 30 and the location of oil pump 32 relative to main chamber 36 of oil tank 30 for example. The size of auxiliary volume VA may be selected based on (e.g., to correspond to or be greater than) a minimum quantity of oil 42 required in main chamber 36 to initiate priming of oil pump 32 after oil pump 32 has been starved of oil 42.

In some embodiments, oil pump 32 may not be capable of generating enough suction from pumping vapours or gases in order to maintain the flow of oil 42 to lubrication load 28 when shifting of oil 42 causes oil pump 32 to be starved. Priming of oil pump 32 may include filling oil pump 32 with oil 42 to allow oil pump 32 to resume the generation of suction upstream of oil pump 32 and also resume the delivery of oil 42 to lubrication load 28. In various embodiments of oil tank 30, auxiliary volume VA of auxiliary chamber 38 may be between 1% and 25% of main volume VM of main chamber 36. In some embodiments of oil tank 30, auxiliary volume VA of auxiliary chamber 38 may be between 1% and 10% of main volume VM of main chamber 36.

Various manoeuvers of aircraft 10 may induce different vertical and/or lateral forces on oil 42 and may cause shifting of oil 42 inside of oil tank 30. FIG. 2A shows exemplary vertical components of such forces shown as downward force F1 and upward force F2. However, it is understood that forces acting on oil 42 may not be purely vertical. Gravity may contribute at least in part to downward force F1 acting on oil 42. Variations in downward force F1 and upward force F2 caused by different manoeuvers of aircraft 10 may cause a different overall resultant force acting on oil 42.

FIG. 2A graphically illustrates downward force F1 and upward force F2 as vectors where downward force F1 is shown as a longer arrow and hence greater than upward force F2 (i.e., F1>F2). During a straight-and-level flight condition of aircraft 10, downward force F1 may be induced solely by gravity and upward force F2 may be substantially nil.

In the situation depicted in FIG. 2A, main chamber 36 of oil tank 30 may contain a relatively large quantity of oil 42 where oil outlet 40 of main chamber 36 and inlet port 46 of oil pump 32 are submerged in oil 42. In this situation, oil pump 32 may be driving oil 42 toward lubrication load 28 and scavenge pump 34 may be driving used oil 42 from lubrication load 28 back toward oil tank 30 for recirculation.

FIG. 2B is a schematic representation of lubrication system 26 during a second flight condition of aircraft 10. The situation illustrated in FIG. 2B may follow the situation illustrated in FIG. 2A and may correspond to a situation where the delivery of oil 42 to lubrication load 28 via oil pump 32 has been interrupted due to shifting of oil 42 inside of oil tank 30. Specifically, the flight condition illustrated in FIG. 2B corresponds to upward force F2 shown as a longer arrow being greater than downward force F1 (i.e., F2>F1). The situation depicted in FIG. 2B may also be referred to as a "negative-g force" condition where, for example, a downward acceleration vector produces a weight-force in an upward direction (e.g., upward force F2) thus causing an upward shift of oil 42 within oil tank 30. During this situation, the resultant force (i.e., F2-F1) acting on oil 42 may be upward thereby causing upward shifting of oil 42 within oil tank 30.

The situation of FIG. 2B may cause oil 42 to shift to an upper portion of oil tank 30 and drain from oil tank 30 via vent opening 50 to one or more cavities in fluid communication with vent opening 50. The shifting of oil 42 may also cause the bottom portion of main chamber 36 to be emptied of oil 42 and consequently cause oil outlet 40 of main chamber 36 and inlet port 46 of oil pump 32 to become exposed (i.e., no longer submerged in oil 42) to, in turn, cause oil pump 32 to be starved of oil 42. The starving of oil pump 32 of oil 42 may result in an interruption of oil delivery to lubrication load 28 via oil pump 32. In the situation of FIG. 2B, oil pump 32 may be continuously operated despite being starved of oil 42.

The amount of oil 42 drained out of vent opening 50 may depend on the duration of the negative-g force condition (i.e., F2>F1) shown in FIG. 2B. In various situations, main chamber 36 of oil tank 30 may be partially or completely emptied of oil 42 during the negative-g force condition. Despite such emptying of main chamber 36, a lubrication recovery quantity of oil 42 may be trapped in auxiliary chamber 38 and be prevented from exiting oil tank 30 via vent opening 50. The lubrication recovery quantity of oil 42 may be equal to or greater than a minimum quantity of oil 42 required in main chamber 36 to cause priming of oil pump 32 after oil pump 32 has been starved of oil 42.

The positioning of auxiliary chamber 38 vertically higher than vent outlet 50 relative to the upright orientation of oil tank 30 may facilitate the retention of oil 42 therein. It is understood that main chamber 36 and auxiliary chamber 38 may have different shapes and different relative positions than those shown herein. For example, auxiliary chamber 38 may be disposed directly above main chamber 36. For example, auxiliary chamber 38 may be disposed laterally (e.g., to the left or to the right) of main chamber 36. For example, auxiliary chamber 38 may be disposed forward or aft of main chamber 36. Main chamber 36 and auxiliary chamber 38 may be in fluid communication with each other via a suitable flow passage.

Figure 2C:
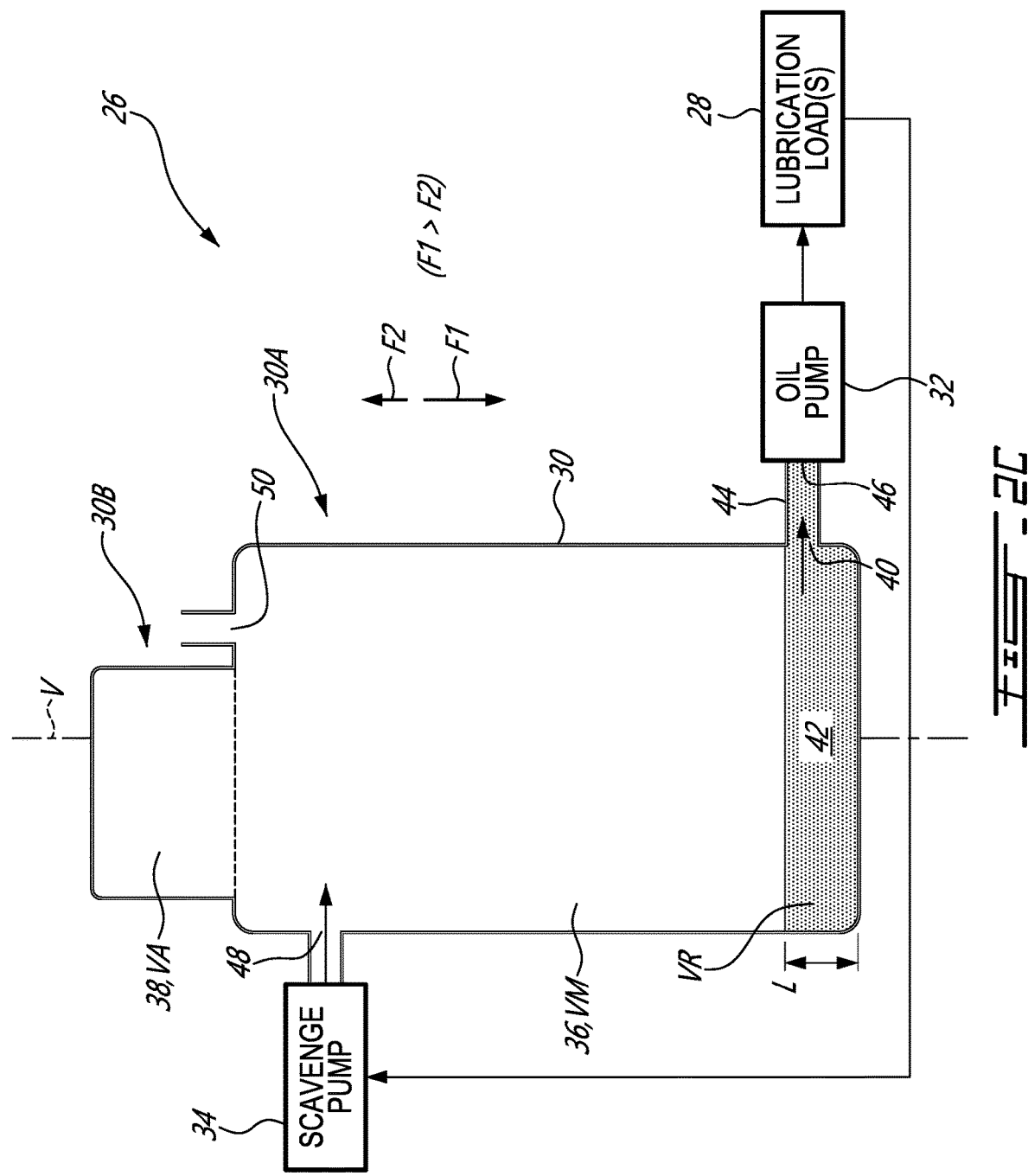
FIG. 2C is a schematic representation of the lubrication system of FIG. 2A during a third flight condition of the aircraft.

Event though FIGS. 2A-2C illustrate a single auxiliary chamber 38, it is understood that second tank portion 30B of oil tank 30 may instead include two or more (e.g., smaller) auxiliary chambers 38 in fluid communication with main chamber 36 and disposed higher than vent outlet 50 to (e.g., collectively) retain the lubrication recovery quantity of oil 42 required to cause priming of oil pump 32. In other words, the function of auxiliary chamber 38 described herein may be achieved using only one auxiliary chamber 38, or using two or more cooperating auxiliary chambers 38 working together.

In some embodiments main chamber 36 and/or auxiliary chamber 38 may be devoid of baffles so that the retention of the lubrication recovery quantity of oil 42 inside of oil tank 30 is not achieved by way of baffles. In some embodiments, the lack of baffles in oil tank 30 may promote a relatively simple construction of oil tank 30 having a relatively low weight. However, in some embodiments, oil tank 30 may be equipped (e.g., instead of or in addition to auxiliary chamber 38) with one or more baffles that facilitate the retention of the lubrication recovery quantity of oil 42 inside of oil tank 30.

FIG. 2C is a schematic representation of lubrication system 26 during a third flight condition of aircraft 10. The situation illustrated in FIG. 2C may follow the situation illustrated in FIG. 2B and may correspond to a flight condition of aircraft 10 where the delivery of oil 42 to lubrication load 28 via oil pump 32 is resumed. Specifically, the flight condition illustrated in FIG. 2C downward force F1 shown as the longer arrow being greater than upward force F2 (i.e., F1>F2). The magnitudes of forces F1, F2 may, in this situation, be substantially the same or may differ from those of the situation illustrated in FIG. 2A. During this flight condition, the resultant force acting on oil 42 may be downward thereby causing downward shifting of the lubrication recovery quantity oil 42 that was trapped in auxiliary chamber 38 to the bottom portion of main chamber 36 of oil tank 30.

The retention of the lubrication recovery quantity oil 42 inside of auxiliary chamber 38 of oil tank 30 during the negative-g force situation of FIG. 2B may allow for a relatively prompt recovery of lubrication system 26 by facilitating the priming of oil pump 32. Instead of further delaying the recovery of lubrication system 26 by having to wait for scavenge pump 34 to drive sufficient oil 42 back into oil tank 30, the trapping of the lubrication recovery quantity oil 42 in auxiliary chamber 38 allows for that amount of oil 42 to be (e.g., substantially immediately) available for priming oil pump 32 promptly following the negative-g force situation of FIG. 2B.

A lower portion of main chamber 36 may define a lubrication recovery volume VR of oil 42 that is required to initiate priming of oil pump 32. Recovery volume VR may correspond to oil level L in a lower portion of main chamber 36 of oil tank 30. Recovery volume VR may correspond to a minimum quantity of oil 42 required in main chamber 36 to cause priming of oil pump 32. For example, recovery volume VR may correspond to a minimum quantity of oil 42 required to have inlet port 46 of oil pump 32 completely submerged in oil 42 when oil tank 30 is in the upright orientation. For example, recovery volume VR may corresponds to a minimum quantity of oil 42 required to have oil outlet 40 of main chamber 36 completely submerged in oil 42 when oil tank 30 is in the upright orientation. Recovery volume VR may include an amount of oil required to fill conduit 44.

FIG. 3 is a schematic representation of another exemplary oil tank 130 suitable for use in lubrication system 26. Oil tank 130 may include elements of oil tank 30 described above. Like elements have been identified using reference numerals that have been incremented by 100. Oil tank 130 may include main chamber 136 defining main volume VM, auxiliary chamber 138 defining auxiliary volume VA, oil outlet 140, oil inlet 148 and vent opening 150. Compared to oil tank 30, only part of auxiliary chamber 138 may be disposed at a higher elevation than vent opening 150. In some embodiments, oil tank 130 may include one or more baffles 152. In some embodiments, an entirety of auxiliary chamber 138 and auxiliary volume VA may be disposed higher than oil inlet 148.

FIG. 3 illustrates a flight condition similar to those of FIGS. 2A and 2C where downward force F1 shown as the longer arrow is greater than upward force F2 (i.e., F1>F2). However, during the flight condition of FIG. 2B when the upward force F2 would be greater than downward force F1 (i.e., F2>F1), the oil retained in auxiliary chamber 138 would still, via baffle 152, be prevented from flowing to vent opening 150 and draining from oil tank 130 via vent opening 150.

FIG. 4 is a flow diagram of method 100 of operating lubrication system 26 of engine 12 or another lubrication system. Aspects of method 100 may be combined with other actions or steps disclosed herein. Aspects of lubrication system 26 may be incorporated into method 100. Method 100 is described below in reference to FIGS. 2A-2C. In various embodiments, method 100 may include
  during a first flight condition (e.g. see FIG. 2A) of aircraft 10 where downward force F1 acting on oil 42 in oil tank 30 of engine 12 is greater than upward force F2 acting on oil 42, using oil pump 32 to deliver oil 42 from oil tank 30 to lubrication load 28 (see block 102);
  following the first flight condition and during a second flight condition (e.g., see FIG. 2B) of aircraft 10 where upward force F2 acting on oil 42 in oil tank 30 of engine 12 is greater than upward force F1 acting on oil 42:
  allowing oil 42 in oil tank 30 to exit oil tank 42 via vent opening 50 of oil tank 30 (see block 104);
  starving oil pump 32 of oil 42 and ceasing to use oil pump 32 to deliver oil 42 from oil tank 30 to lubrication load 28 (see block 106); and
  preventing a lubrication recovery quantity of oil 42 in oil tank 30 from exiting oil tank 30 via vent opening 50 of oil tank 30 (see block 108); and
  following the second flight condition and during a third flight condition (e.g., see FIG. 2C) of aircraft 10 where downward force F1 acting on oil 42 in oil tank 30 of engine 12 is greater than upward force F2 acting on oil 42:
  using the lubrication recovery quantity of oil 42 in oil tank 30 to prime oil pump 32 (see block 110); and
  resuming to use oil pump 32 to deliver oil 42 from oil tank 30 to lubrication load 28 (see block 112).

During the third flight condition (e.g., see FIG. 2C), method 100 may include returning oil 42 allowed to exit oil tank 30 via vent opening 50 of oil tank 30 back to oil tank 30 via oil inlet 48 using scavenge pump 34 for example. Alternatively or in addition, some of oil 42 may return back to oil tank 30 via vent opening 50 for example.

Preventing the lubrication recovery quantity of oil 42 in oil tank 30 from exiting oil tank 30 via vent opening 50 of oil tank 30 may include retaining the lubrication recovery quantity of oil 42 in one or more auxiliary chambers 38 of oil tank 30.

Preventing the lubrication recovery quantity of oil 42 in oil tank 30 from exiting oil tank 30 via vent opening 50 of oil tank 30 may include retaining the lubrication recovery quantity of oil in a region of oil tank 30 higher than vent opening 50 of oil tank 30 relative to an upright orientation of oil tank 30.

In some embodiments, method 100 may include using substantially only the lubrication recovery quantity of oil 42 in oil tank 30 to initiate priming of oil pump 32.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

What is claimed is:

1. An aircraft engine comprising:
   an aircraft engine oil tank including:
      a first tank portion defining a first volume for holding oil, the first tank portion including an oil outlet for delivering oil to a lubrication load, the first volume being in fluid communication with a vent opening for venting the aircraft engine oil tank, the oil outlet being disposed lower than the vent opening relative to an upright orientation of the aircraft engine oil tank; and
      a second tank portion defining a second volume in fluid communication with the first volume, at least part of the second volume being disposed higher than the vent opening relative to the upright orientation of the aircraft engine oil tank, the second tank portion being laterally separated from the vent opening relative to the upright orientation of the aircraft engine oil tank, an oil-holding capacity of the second volume being equal to or greater than a minimum quantity of oil required in the first volume for the oil outlet to be submerged in the oil in the upright orientation of the aircraft engine oil tank, the second tank portion holding oil in the second volume and preventing the oil in the second volume from flowing to the vent opening when an upward force acting on the oil in the second volume is greater than a downward force acting on the oil in the second volume relative to the upright orientation of the aircraft engine oil tank, the second tank portion being configured to prevent the oil in the second volume from draining from the aircraft engine oil tank when the upward force is greater than the downward force;
   a lubrication load;
   an oil pump in fluid communication with the oil tank and with the lubrication load, the oil pump driving oil from the oil tank toward the lubrication load; and
   a scavenge pump in fluid communication with the oil tank and with the lubrication load, the scavenge pump driving oil from the lubrication load toward the oil tank for recirculation.

2. The aircraft engine as defined in claim 1, wherein the oil-holding capacity of the second volume is between 1% and 25% of the oil-holding capacity of the first volume.

3. The aircraft engine as defined in claim 1, wherein the oil-holding capacity of the second volume is between 1% and 10% of the oil-holding capacity of the first volume.

4. The aircraft engine as defined in claim 1, wherein the first tank portion is devoid of baffles.

5. The aircraft engine as defined in claim 1, wherein the second tank portion is devoid of baffles.

6. The aircraft engine as defined in claim 1, wherein the vent opening is disposed in the first tank portion.

7. The aircraft engine as defined in claim 1, wherein the second tank portion includes only one auxiliary chamber defining an entirety of the second volume.

8. The aircraft engine as defined in claim 1, wherein an entirety of the second volume is disposed higher than the vent opening.

9. A lubrication system of an aircraft engine, the lubrication system comprising:
   an oil pump in fluid communication with a lubrication load for driving oil toward the lubrication load; and
   an oil tank in fluid communication with the oil pump for supplying oil to the oil pump, the oil tank including:
      a main chamber including:
         an oil outlet for delivering oil to the oil pump; and
         a vent opening for venting the main chamber, the vent opening being located higher than the oil outlet relative to an upright orientation of the oil tank associated with a straight-and-level flight condition of the aircraft; and
      an auxiliary chamber in fluid communication with the main chamber, at least part of the auxiliary chamber being disposed higher than the vent opening relative the upright orientation of the oil tank, the auxiliary chamber being laterally separated from the vent opening relative to the upright orientation of the oil tank, an oil-holding capacity of the auxiliary chamber being equal to or greater than a minimum quantity of oil required in the main chamber to cause priming of the oil pump, the auxiliary chamber holding oil in the auxiliary chamber and preventing the oil in the auxiliary chamber from flowing to the vent opening when an upward force acting on the oil in the auxiliary chamber is greater than a downward force acting on the oil in the auxiliary chamber relative to the upright orientation of the oil tank, the auxiliary chamber being devoid of an outlet that permits the oil in the auxiliary chamber to drain from the oil tank when the upward force is greater than the downward force; and
   a scavenge pump in fluid communication with the oil tank and with the lubrication load, the scavenge pump driving oil from the lubrication load toward the oil tank for recirculation.

10. The lubrication system as defined in claim 9, wherein the oil-holding capacity of the auxiliary chamber is equal to or greater than a minimum quantity of oil required for an inlet port of the pump to be submerged in the oil.

11. The lubrication system as defined in claim 10, wherein the oil pump is disposed outside of the oil tank.

12. The lubrication system as defined in claim 11, comprising a conduit establishing fluid communication between the oil outlet of the main chamber and the inlet port of the pump, the oil-holding capacity of the auxiliary chamber being equal to or greater than a minimum quantity of oil required to fill the conduit with the oil.

13. The lubrication system as defined in claim 9, wherein the oil-holding capacity of the auxiliary chamber is equal to or greater than a minimum quantity of oil required for the oil outlet of the main chamber to be submerged in the oil.

14. The lubrication system as defined in claim 9, wherein the oil-holding capacity of the auxiliary chamber is between 1% and 10% of an oil-holding capacity of the main chamber.

15. The lubrication system as defined in claim 9, wherein an entirety of the auxiliary chamber is disposed higher than an oil inlet for receiving oil into the main chamber.

* * * * *